(12) United States Patent
Walczak et al.

(10) Patent No.: US 11,933,424 B2
(45) Date of Patent: Mar. 19, 2024

(54) GAS ADMISSION VALVE INCLUDING SEAL REDUNDANCY, AND METHOD OF SEALING A GAS ADMISSION VALVE

(71) Applicant: Caterpillar Inc., Peoria, IL (US)

(72) Inventors: Jakub M. Walczak, Lafayette, IN (US); Prabhu Nagaraj, Tamil Nadu (IN); Kevin D. Yoder, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 181 days.

(21) Appl. No.: 17/379,630

(22) Filed: Jul. 19, 2021

(65) Prior Publication Data

US 2023/0018227 A1 Jan. 19, 2023

(51) Int. Cl.
| | |
|---|---|
| *F16K 41/04* | (2006.01) |
| *F01M 9/10* | (2006.01) |
| *F02M 35/10* | (2006.01) |
| *F16K 31/524* | (2006.01) |
| *F16N 7/00* | (2006.01) |

(52) U.S. Cl.
CPC ............ *F16K 41/04* (2013.01); *F01M 9/10* (2013.01); *F02M 35/10209* (2013.01); *F02M 35/10242* (2013.01); *F16N 7/00* (2013.01); *F16K 31/52408* (2013.01); *F16N 2210/00* (2013.01)

(58) Field of Classification Search
CPC ..... F16K 41/04; F16K 31/52408; F01M 9/10; F02M 35/10209; F02M 35/10242; F16N 7/00; F16N 2210/00
See application file for complete search history.

(56) References Cited

U.S. PATENT DOCUMENTS

| | | | |
|---|---|---|---|
| 4,519,372 | A | 5/1985 | Hoffman |
| 5,346,136 | A | 9/1994 | Bassett |
| 7,392,822 | B2 | 7/2008 | Kimmell |
| 8,091,580 | B2 | 1/2012 | Gentry |
| 8,375,902 | B2 | 2/2013 | Berger et al. |
| 8,925,576 | B2 | 1/2015 | Spliethoff et al. |
| 2012/0111297 | A1* | 5/2012 | Netzer ............... F01L 3/10 277/502 |
| 2021/0033046 | A1 | 2/2021 | Sixel et al. |

FOREIGN PATENT DOCUMENTS

| | | |
|---|---|---|
| CN | 2293488 Y | 10/1998 |
| CN | 203906425 U | 10/2014 |
| CN | 208272032 U | 12/2018 |
| WO | WO-2016075093 A1 * 5/2016 ............ F02M 26/50 |
| WO | WO 2019/206687 A1 | 10/2019 |

OTHER PUBLICATIONS

Written Opinion and International Search Report for Int'l. Patent Appln. No. PCT/US2022/035488, dated Nov. 2, 2022 (7 pgs).

* cited by examiner

*Primary Examiner* — Jacob M Amick
*Assistant Examiner* — Charles J Brauch
(74) *Attorney, Agent, or Firm* — Leydig, Voit & Mayer, Ltd

(57) ABSTRACT

Gas admission valve assembly includes a housing, an elongated valve guide disposed within a central bore of the housing, a valve including a valve stem slidably disposed within the valve guide and a valve head selectively engagable with a valve seat of the housing to control flow between gas entry and exit openings into a housing entry chamber. First and second stem seals are disposed at opposite ends of the valve guide in sealing engagement with the valve stem between the valve stem and the central bore of the housing distally and the valve guide proximally.

20 Claims, 2 Drawing Sheets

US 11,933,424 B2

GAS ADMISSION VALVE INCLUDING SEAL REDUNDANCY, AND METHOD OF SEALING A GAS ADMISSION VALVE

TECHNICAL FIELD

This patent disclosure relates generally to gas admission valves and, more particularly to methods of sealing and sealing arrangements for gas admission valves to reduce gas leakage.

BACKGROUND

Gas admission valves are used to regulate the flow of gas within an engine. Disposed between a source of gas and an intake manifold, a gas admission valve regulates the flow of gas into the intake manifold where the gas mixes with inlet air. The mixture flows to a cylinder where it is subsequently ingested and combusted.

Gas admission valves include a seal designed to ensure accurate flow through the valve and to inhibit leakage of gas within the valve. Seal wear or failure may allow gas to leak past the seal and elsewhere within the engine. Premature wear or failure of the seal or the gas admission valve may result in undesirable downtime for repair or replacement of the seal or complete valve.

The reference U.S. Pat. No. 8,375,902 B2 discloses a poppet valve having a valve head and a valve stem. According to the reference, the poppet valve has two valve seals around the valve stem at top and bottom of the valve stem to inhibit leakage of air from the air chamber around the valve stem.

SUMMARY

The disclosure describes, in one aspect, a gas admission valve assembly for controlling the flow of a gas. The gas admission valve assembly includes a housing, a valve, an elongated valve guide, and a first and second stem seals. The housing includes a central bore defining a central axis and an entry chamber disposed about said central axis. At least one gas entry opening and a gas exit opening opens into the entry chamber. A valve seat is disposed about the gas exit opening. The gas exit opening and the valve seat are concentrically disposed about the central axis. The valve includes a valve head and a valve stem. The valve stem has a peripheral surface, a distal stem end and a proximal stem end. The valve head is disposed at the distal stem end of the valve stem. The valve stem is slidably disposed for movement along the central axis to selectively move the valve head into and out of contact with the valve seat such that the valve head blocks flow between the entry chamber and the gas exit opening when the valve head is in contact with the valve seat. The elongated valve guide has a proximal guide end and a distal guide end, and is concentrically disposed about a portion of the valve stem, that is, between the valve stem and the central bore of the housing. The valve stem is slidably disposed within the elongated valve guide for movement along the central axis. The first stem seal is disposed at the distal end of the elongated valve guide, and the second stem seal is disposed at the proximal end of the elongated valve guide. The first stem seal is disposed in sealing engagement with the peripheral surface of the valve stem between the valve stem and the central bore of the housing to inhibit flow from the entry chamber between the valve stem and the housing. The second stem seal is disposed in sealing engagement with the peripheral surface of the valve stem.

The disclosure describes in another aspect, an engine including a source of pressurized gas, at least one cylinder, an intake manifold selectively fluidly coupled to the at least one cylinder, and a gas admission valve assembly for controlling the flow of gas into the intake manifold. The gas admission valve includes a housing, a valve, an elongated valve guide, and first and second stem seals. The housing includes a central bore defining a central axis, an entry chamber disposed about said central axis. A gas exit opening and at least one gas entry opening open into the entry chamber. The at least one gas entry opening is fluidly coupled to the source of pressurized gas. A valve seat is disposed about the gas exit opening, the gas exit opening and the valve seat being concentrically disposed about the central axis. The valve includes a valve head and a valve stem. The valve stem has a peripheral surface, a distal stem end and a proximal stem end. The valve head is disposed at the distal stem end of the valve stem. The valve stem is slidably disposed for movement along the central axis to selectively move the valve head into and out of contact with the valve seat. The gas exit opening is fluidly coupled to the intake manifold when the valve head is not in contact with the valve seat, and the valve head blocks flow between the entry chamber and the gas exit opening when the valve head is in contact with the valve seat. The elongated valve guide has a proximal guide end and a distal guide end, and is concentrically disposed about a portion of the valve stem between the valve stem and the central bore of the housing. The valve stem is slidably disposed within the elongated valve guide for movement along the central axis. The first stem seal is disposed at the distal end of the elongated valve guide, and the second stem seal is disposed at the proximal end of the elongated valve guide. The first stem seal is disposed in sealing engagement between the peripheral surface of the valve stem and the central bore of the housing to inhibit flow from the entry chamber between the valve stem and the housing. The second stem seal is disposed in sealing engagement with the peripheral surface of the valve stem.

This disclosure describes in yet another aspect a method of inhibiting leakage of gas in a gas admission valve assembly for controlling the flow of gas in an engine. The method includes providing a housing including a central bore defining a central axis, an entry chamber disposed about said central axis, at least one gas entry opening that opens into the entry chamber, a gas exit opening that opens into the entry chamber, a valve seat disposed about the gas exit opening, the gas exit opening and the valve seat being concentrically disposed about the central axis. The method further includes disposing an elongated valve guide within the central bore, the valve guide having a tubular structure with a central longitudinal bore, providing a valve including a valve head and a valve stem, and slidably disposing the valve stem within the central longitudinal bore of the valve guide with the valve head disposed to selectively move into and out of contact with the valve seat to selectively provide a flow of gas from the at least one gas entry opening through the entry chamber and to the gas exit opening. The method also includes disposing a first stem seal between a distal end of the valve guide and a retainer, and in sealing engagement with the peripheral surface of the valve stem and the central bore of the housing to inhibit flow from the entry chamber between the valve stem and the housing. The method further includes disposing a second stem seal in sealing engagement with the peripheral surface of the valve stem and a proximal end of the valve guide.

BRIEF DESCRIPTION OF THE DRAWING(S)

DETAILED DESCRIPTION

This disclosure relates to a gas admission valve assembly 100 for an engine 102 of a machine 104. It will be appreciated that the arrangement disclosed herein has universal applicability in various types of machines, including mobile and immobile machines. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like.

Figure 1:
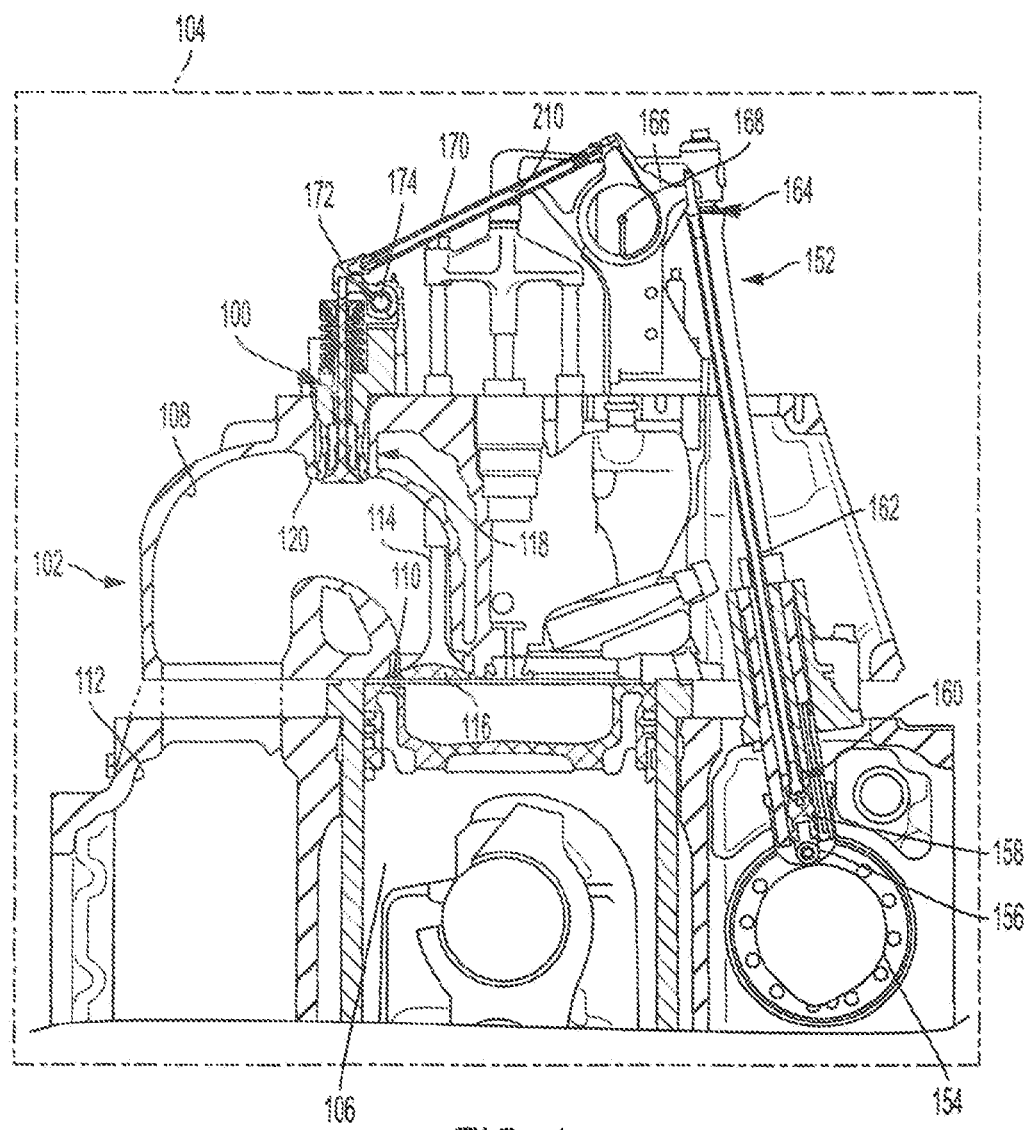
FIG. 1 is a fragmentary, side elevational, cross-sectional, schematic view of a machine housing an engine including a gas admission valve incorporating aspects of this disclosure.

The engine 102 may include one or more cylinders 106. While only one cylinder is illustrated in FIG. 1, the engine 102 may include a plurality of such cylinders 106. An intake manifold 108 may be provided with a supply of compressed air that may be selectively provided to the cylinder 106 through an opening 110. Compressed air may be provided to the intake manifold 108 by any appropriate arrangement, flow in the illustrated embodiment being provided from chamber 112. An intake valve 114 may be selectively operated to move an intake valve cover 116 to open or close the opening 110 between the intake manifold 108 and the cylinder 106 to selectively fluidly couple the intake manifold 108 to the cylinder 106. Within the cylinder 106, a mixture of air and fuel or gas may be combusted.

Figure 2:
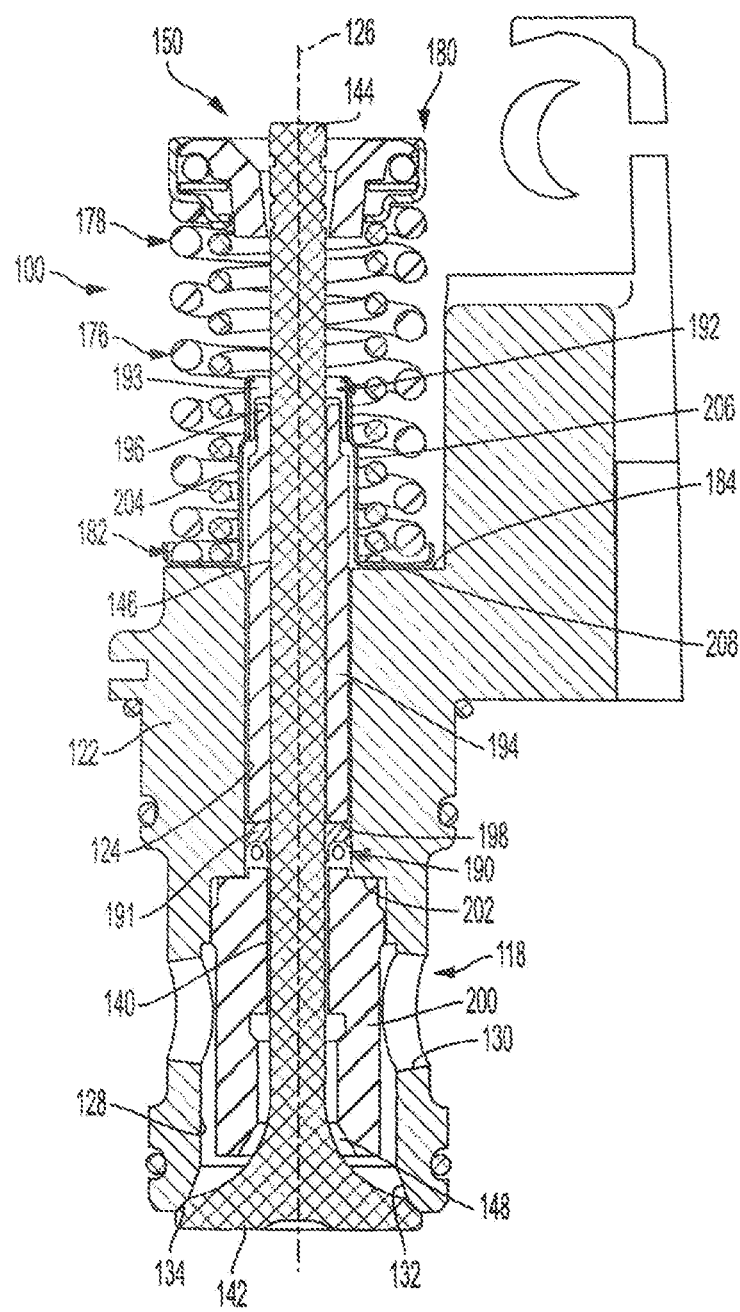
FIG. 2 is an enlarged, side elevational, cross-sectional view of the gas admission valve of FIG. 1.

In order to selectively control a flow of fuel or gas (supply shown generally as 118) to the intake manifold 108 for mixing with the compressed air, the gas admission valve assembly 100 is provided to selectively provide the flow of gas 118 through an opening 120 in the intake manifold 108. Referring to FIG. 2, the gas admission valve assembly 100 includes a housing 122 having a central bore 124 that defines a central axis 126. The housing 122 further includes an entry chamber 128 along the central axis 126. In order to allow for the passages of gas through the entry chamber 128, the housing 122 includes at least one gas entry opening 130 and a gas exit opening 132 that both open into the entry chamber 128. In the illustrated embodiment, the gas entry opening 130 is fluidly coupled to the supply of gas 118, while the gas exit opening 132 is disposed to provide a flow of gas 118 to the intake manifold 108 through opening 120 of the intake manifold 108. The gas exit opening 132 defines a valve seat 134, the gas exit opening 132 and the valve seat 134 being concentrically about the central axis 126.

In order to selectively open and close the gas exit opening 132, a valve 140 is slidably disposed along the central axis 126 in the central bore 124 in the housing 122. The valve 140 includes a valve head 142 and a valve stem 144. The valve stem 144 is an elongated structure that includes a peripheral surface 146, a distal stem end 148 and a proximal stem end 150. The valve head 142 is disposed at the distal stem end 148 of the valve stem 144. As the valve stem 144 moves along the central axis 126 within the central bore 124 of the housing 122, the valve head 142 may be selectively moved into and out of contact with the valve seat 134. In this way, when the valve head 142 is seated against the valve seat 134, the gas admission valve assembly 100 blocks the flow of gas from the entry chamber 128 through the gas exit opening 132 into the opening 120 into the intake manifold 108. Conversely, when the valve head 142 is not seated against the valve seat 134, the gas admission valve assembly 100 allows the flow of gas from the gas supply 118 through the at least one gas entry opening 130 into entry chamber 128, and from the entry chamber 128 through the gas exit opening 132 into the opening 120 into the intake manifold 108.

Movement of the valve 140 may be provided by any appropriate mechanism. Referring again to FIG. 1, in the illustrated embodiment, the movement of the valve 140 is provided by an actuation assembly (identified generally as 152). The actuation assembly 152 includes a rotatably mounted cam 154. As the cam 154 rotates, a cam follower 156 provides a linear movement to a lifter 158, which engages a first end 160 of a first pushrod 162 to provide axial movement to the pushrod 162. A second end 164 of the pushrod 162 is coupled to a first rocker arm 166, the first rocker arm 166 being pivotably mounted about axis 168. The first rocker arm 166 is likewise coupled to a second pushrod 170. As the first rocker arm 166 pivots due to axial movement of the first pushrod 162, the first rocker arm 166 likewise moves the second pushrod 170. The second pushrod 170 as well as the proximal stem end 150 of the valve 140 are coupled to a second rocker arm 172, which is pivotably mounted at axis 174. As second pushrod 170 pivots the second rocker arm 172, an axial force is applied to the valve stem 144 to move the valve 140 in a distal direction to unseat the valve head 142 from the valve seat 134, opening flow from the entry chamber 128 to the intake manifold 108.

Returning to again to FIG. 2, in order to provide a tight seal between the valve head 142 and the valve seat 134 when the valve assembly 100 is closed, one or more biasing elements 176 may be provided. In the illustrated embodiment, a spring pack 178 including two springs and a rotocoil is provided. A proximal end 180 of the spring pack 178 is coupled to the valve stem 144, while a distal end 182 of the spring pack 178 is disposed toward a base surface 184 of the housing 122. In this way, the biasing element(s) 176, here, spring pack 178, exerts a force to bias the valve 140 in a proximal direction within the housing 122, that is, to bias the valve head 142 against the valve seat 134.

In order to maintain an accurate flow of gas through the entry chamber 128, the valve assembly 100 is provided with a dual sealing arrangement. The sealing arrangement includes a first stem seal 190 and a second stem seal 192. In order to position the first and second stem seals 190, 192, an elongated valve guide 194 is between the valve stem 144 and the central bore 124 of the housing 122. The elongated valve guide 194 includes a proximal guide end 196 and a distal guide end 198, and is concentrically disposed about a portion of the valve stem 144. The valve stem 144 is slidably disposed within the elongated valve guide 194 for movement along the central axis the valve guide 194, which is coincident with the central axis 126 of the housing 122.

The first stem seal 190 is disposed between the valve stem 144 and the central bore 124 of the housing 122. That is, the first stem seal 190 is disposed with a first sealing element 191 in sealing engagement with the peripheral surface 146 of the valve stem 144 and the central bore 124 of the housing 122 to inhibit flow from the entry chamber 128 between the valve stem 144 and the housing 122. The first sealing element 191 may be formed of any appropriate material, such as, for example, a neoprene rubber. In assembly, the first stem seal 190 is positioned within the central bore 124. A retainer 200 is then positioned within the entry chamber 128, the retainer 200 bearing against a proximal internal surface 202 of the entry chamber 128.

The second stem seal 192 is disposed proximally to the first stem seal 190 to provide a seal between the proximal guide end 196 and the valve stem 144. The second stem seal 192 includes a second sealing element 193 that is held in sealing engagement at the proximal guide end 196 along the peripheral surface 146 of the valve stem 144.

The second sealing element 193 may be held in position by a support 204. The support 204 may include a vertical element 206 and a horizontal element 208. In at least one embodiment, the vertical element 206 has a tubular structure, while the horizontal element 208 is a flange that extends outward at a substantially normal angle to the vertical element. In order to retain the support 204 in position, the horizontal element 208 may be disposed between the distal end 182 of the spring pack 178 and the base surface 184 of the housing 122, the biasing element(s) 196 exerting a retaining force against the horizontal element 208. In this way, the vertical element 206 may be disposed substantially parallel to the valve stem 144 retaining the second sealing element 193 in contact along the valve stem 144 while the valve stem 144 may translate along the central axis 126.

According to another aspect of this disclosure, in order to facilitate smooth translation of the valve stem 144 within the elongated valve guide 194, the second stem seal 192 may provide a metering of lubricant between the valve stem 144 and the elongated valve guide 194. That is, a lubricant, such as a lubricating oil, maybe provided along an outer surface of the valve stem 144, the second stem seal 192 allowing only a metered amount of the lubricant to pass between the valve stem 144 and the elongated valve guide 194. While the lubricant may be provided to the proximal stem end 150 by any appropriate arrangement, in the illustrated embodiment, the lubricant may be fed through an internal chamber 210 of the second pushrod 170 (see FIG. 1), although an alternate arrangement may be provided.

INDUSTRIAL APPLICABILITY

The present disclosure is applicable to gas admission valve assemblies 100 that may be utilized in the engines 102 of a variety of machines 104, both mobile and stationary, to inhibit leakage of gas.

In at least some embodiments, the use of dual seal allows for an enhanced sealing strategy. The top seal may perform the function of metering oil, which may lubricate the bottom seal and may allow it to work optimally for an extended period of time. In the event that the bottom seal wears out or exhibits a failure, the top seal may also have a gas sealing function, acting as a secondary gas seal in the event of leakage past the bottom seal.

In at least some embodiments, the disclosed arrangements may prolong the life of the sealing arrangement to inhibit valve failure and prolong the life of the associated gas admission valve. In this way, at least some of the disclosed embodiments may minimize machine downtime and delays for repairs or replacement, as well as the costs associated with the same.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A gas admission valve assembly for controlling the flow of a gas, the gas admission valve assembly comprising:

a housing including a central bore defining a central axis, an entry chamber disposed about said central axis, at least one gas entry opening that opens into the entry chamber, a gas exit opening that opens into the entry chamber, and a valve seat disposed about the gas exit opening, the gas exit opening and the valve seat being concentrically disposed about the central axis;

a valve including a valve head and a valve stem, the valve stem having a peripheral surface, a distal stem end and a proximal stem end, the valve head being disposed at the distal stem end of the valve stem, the valve stem being slidably disposed for movement along the central axis of the housing to selectively move the valve head into and out of contact with the valve seat, the valve head blocking flow between the entry chamber and the gas exit opening when the valve head is in contact with the valve seat;

an elongated valve guide having a proximal guide end and a distal guide end, and being concentrically disposed about a portion of the valve stem between the valve stem and the central bore of the housing, the valve stem being slidably disposed within the elongated valve guide for movement along the central axis;

a first stem seal disposed distally the elongated valve guide and in sealing engagement with the peripheral surface of the valve stem and the central bore of the housing to inhibit flow from the entry chamber between the valve stem and the housing;

a second stem seal including a second sealing element disposed in sealing engagement with the peripheral surface of the valve stem at the proximal guide end; and a biasing element coupled to the proximal stem end, the biasing element including proximal and distal biasing element ends, the second stem sealing element being disposed between the proximal biasing element end and the distal biasing element end.

2. The gas admission valve assembly of claim 1 wherein the second stem seal inhibits a flow of gas between the valve stem and the elongated valve guide, and meters a flow of a lubricant between the valve stem and the elongated valve guide.

3. The gas admission valve assembly of claim 1 further comprising a retainer, the retainer being disposed within the entry chamber about the valve stem.

4. The gas admission valve assembly of claim 1 wherein the second stem seal further includes a support, wherein the support retains the second sealing element about the peripheral surface of the valve stem substantially adjacent the proximal guide end.

5. The gas admission valve assembly of claim 4 wherein the support includes a vertical element and a horizontal element, the vertical element being disposed substantially parallel to the valve stem retaining the second sealing element in contact along the valve stem and the horizontal element being disposed substantially adjacent the housing.

6. The gas admission valve assembly of claim 5 wherein the vertical element is tubular including a support peripheral surface, and the horizontal element is a flange extending at a substantially normal angle to the support peripheral surface of the vertical element.

7. The gas admission valve assembly of claim 1 the biasing element exerts a retaining force to bias the valve head into contact with the valve seat.

8. The gas admission valve assembly of claim 1 wherein the housing includes a base surface, the biasing element being disposed to exert the retaining force on the valve stem between the base surface and the proximal stem end.

9. The gas admission valve assembly of claim 8 wherein the second stem seal further includes a support, wherein the support includes a vertical element and a horizontal element, the vertical element being disposed substantially parallel to the valve stem and retaining the second sealing element about the peripheral surface of the valve stem substantially adjacent the proximal guide end, the horizontal element being disposed between the biasing element and the base surface.

10. An engine comprising:
a source of pressurized gas;
at least one cylinder;
an intake manifold selectively fluidly coupled to the at least one cylinder;
a gas admission valve assembly including:
a housing including a central bore defining a central axis, an entry chamber disposed about said central axis, at least one gas entry opening that opens into the entry chamber, the at least one gas entry opening being fluidly coupled to the source of pressurized gas, a gas exit opening that opens into the entry chamber, a valve seat disposed about the gas exit opening, the gas exit opening and the valve seat being concentrically disposed about the central axis;
a valve including a valve head and a valve stem, the valve stem having a peripheral surface, a distal stem end and a proximal stem end, the valve head being disposed at the distal stem end of the valve stem, the valve stem being slidably disposed for movement along the central axis of the housing to selectively move the valve head into and out of contact with the valve seat, the valve head blocking flow between the entry chamber and the gas exit opening when the valve head is in contact with the valve seat, the gas exit opening being fluidly coupled to the intake manifold when the valve head is not in contact with the valve seat;
an elongated valve guide concentrically disposed about a portion of the valve stem between the valve stem and the central bore of the housing, the valve stem being slidably disposed within the elongated valve guide for movement along the central axis, the valve guide having a proximal guide end and a distal guide end;
a first stem seal disposed distally the elongated valve guide in sealing engagement with the peripheral surface of the valve stem and the central bore of the housing to inhibit flow of gas from the entry chamber between the valve stem and the housing; and
a second stem seal including a second sealing element and a support, the support including a vertical element and a horizontal element, the vertical element being disposed substantially parallel to the valve stem, the second sealing element being disposed proximally the elongated valve guide in sealing engagement with the peripheral surface of the valve stem at the proximal guide end, the second sealing element being disposed between and in sealing engagement with the vertical element and the peripheral surface of the valve stem.

11. The engine of claim 10 further including a source of lubricant selectively coupled to the proximal stem end, the second stem seal metering a flow of a lubricant between the valve stem and the elongated valve guide, and inhibiting passage of gas between the valve stem and the elongated valve guide.

12. The engine of claim 10 wherein the gas admission valve assembly further includes a retainer, the retainer being disposed within the entry chamber about the valve stem.

13. The engine of claim 10 wherein the support retains the second sealing element about the peripheral surface of the valve stem substantially adjacent the proximal guide end.

14. The engine of claim 13 wherein the horizontal element is disposed substantially adjacent the housing.

15. The engine of claim 10 further comprising a biasing element coupled to the proximal stem end, the biasing element exerting a retaining force to bias the valve head into contact with the valve seat.

16. The engine of claim 15 wherein the housing includes a base surface, the biasing element being disposed exert the retaining force on the valve stem between the base surface and the proximal stem end.

17. The engine of claim 16 wherein the vertical element retains the second sealing element about the peripheral surface of the valve stem substantially adjacent the proximal guide end, the horizontal element being disposed between the biasing element and the base surface.

18. The engine of claim 10 further comprising a rocker arm coupled to the proximal stem end, the rocker arm being adapted to exert an actuating force to the valve stem to unseat the valve head from the valve seat.

19. A method of inhibiting leakage of gas in a gas admission valve assembly for controlling the flow of gas in an engine, the method including:
- providing a housing including a central bore defining a central axis, an entry chamber disposed about said central axis, at least one gas entry opening that opens into the entry chamber, a gas exit opening that opens into the entry chamber, a valve seat disposed about the gas exit opening, the gas exit opening and the valve seat being concentrically disposed about the central axis;
- disposing an elongated valve guide within the central bore, the valve guide having a tubular structure with a central longitudinal bore;
- providing a valve including a valve head and a valve stem, and slidably disposing the valve stem within the central longitudinal bore of the elongated valve guide with the valve head disposed to selectively move into and out of contact with the valve seat to selectively provide a flow of gas from the at least one gas entry opening through the entry chamber and to the gas exit opening;
- disposing a first stem seal in sealing engagement with the peripheral surface of the valve stem between the valve stem and the central bore of the housing and between a distal end of the valve guide and a retainer to inhibit flow from the entry chamber between the valve stem and the housing;
- disposing a biasing element having biasing element proximal end and a biasing element distal end about the valve stem; and
- disposing a second sealing element of a second stem seal between the biasing element proximal end and the biasing element distal end in sealing engagement with the peripheral surface of the valve stem at a proximal guide end.

20. The method of claim 19 wherein disposing the second sealing element of the second stem seal includes disposing the second sealing element of the second stem seal about the valve stem and disposing a support of the second stem seal against a base of the housing, and disposing the biasing element includes disposing the biasing element against the support to sandwich the support between the biasing element and the base, securing the biasing element to the valve stem whereby the biasing element exerts a force on the valve stem and the housing to bias the valve head against the valve seat, and metering a flow of a lubricant between the valve stem and the elongated valve guide.

* * * * *